F. H. MOYER.
DEMOUNTABLE RIM.
APPLICATION FILED APR. 17, 1914.
1,116,723.
Patented Nov. 10, 1914.
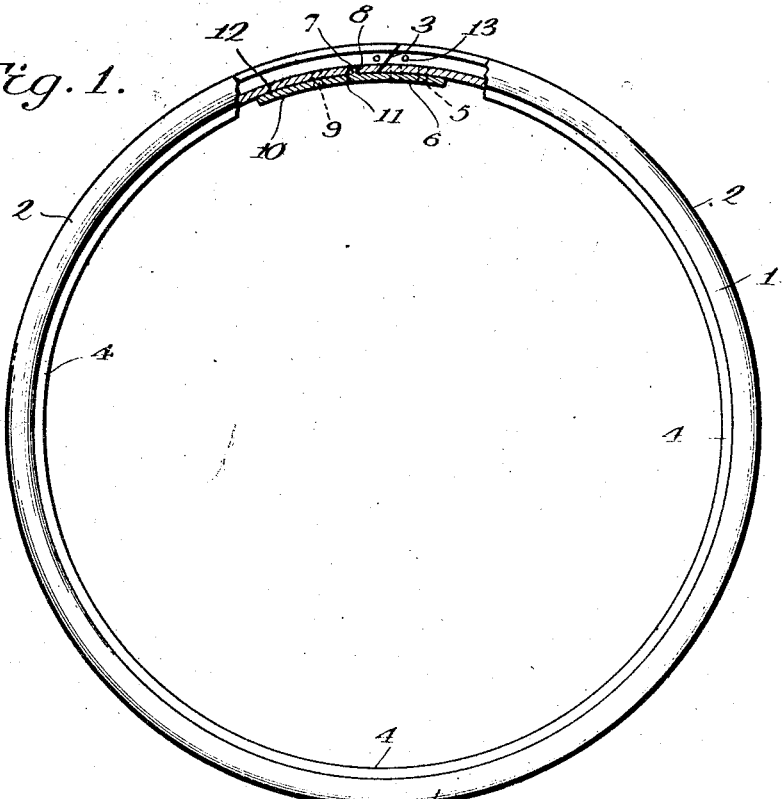
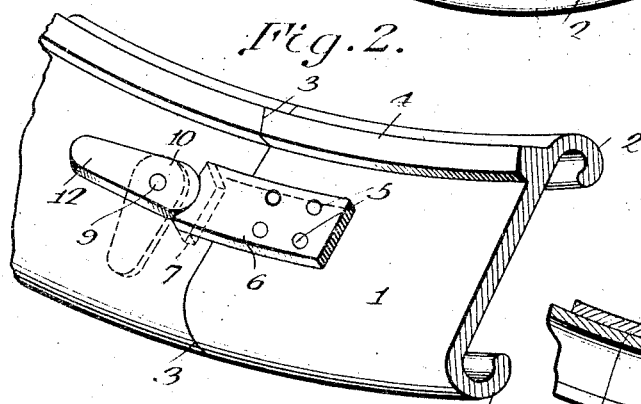
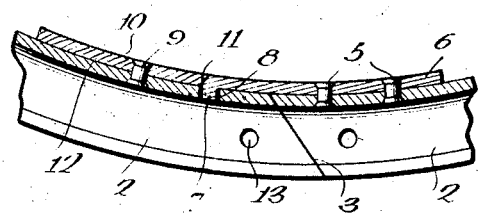
Witnesses:
Chas. T. Gardner
Cleo N. Paris
Inventor:
Fredellia H. Moyer
By Robert W. Tibbey
His Attorney

UNITED STATES PATENT OFFICE.

FREDELLIA H. MOYER, OF CLEVELAND, OHIO.

DEMOUNTABLE RIM.

REISSUED

1,116,723.

Specification of Letters Patent. Patented Nov. 10, 1914.

Application filed April 17, 1914. Serial No. 832,408.

*To all whom it may concern:*

Be it known that I, FREDELLIA H. MOYER, a citizen of the United States, and a resident of the city of Cleveland, in the county of Cuyahoga and State of Ohio, have invented certain new and useful Improvements in Demountable Rims, of which the following is a specification.

The invention relates to improvements in demountable rims of that type known as split rims and has as its object the providing of a base rim section split on a diagonal plane, having mounted on its under surface, adjacent to one of the split ends thereof, a locking cleat provided with a hook adapted to engage an aperture in the opposite end beyond the split, said hook being formed at an angle greater than the split in said rim, so as to provide means for forcing the split ends into a closer positive contact when an inflated tire is mounted thereon.

Another and further object of the invention is the providing of a lever clip pivotally mounted in the split end of said rim adjacent to said aperture for locking the hooked end of said cleat permanently into position in said aperture, thereby preventing the rim base from resetting into an eccentric position. Said locking lever also assisting said cleat in drawing the split ends of said rim into a closed permanent position when associated with a tire of any type.

In the following is described in connection with the accompanying drawings, one embodiment of the invention the features thereof being more particularly pointed out hereinafter in the claim.

In the drawings Figure 1. is a face elevation of the rim part thereof being shown in annular section to more clearly define the invention; Fig. 2. is an inverted perspective view of the rim at the split point thereof showing the locking cleat and its locking means in a set locked position, and said locking lever in an unlocked position; and Fig. 3. is an enlarged fragmentary annular sectional view of the split rim locking means.

Similar numerals of reference indicate similar parts throughout the several views.

In the drawings 1 indicates a rim base provided with clencher flanges 2 cut through or split at 3 on a predetermined diagonal plane and provided with an annular rib 4 adapted to rest on a suitable fixed rim. One end of said rim base 1 near said diagonal cut has mounted on its under surface, by means of rivets 5 a spring locking cleat 6 projecting over the cut and having formed on its end an upwardly turned hook 7, the hooked portion being formed into a greater angle than the split ends of the rim base. The end of the rim base opposite the split having cut therein an aperture 8 adapted to receive said hook 7 when the rim is in its locked position. The object of having two diverse angles in the split and hook is to provide means for closing all space at the split in the rim when an inflated tire is placed into position thereon.

The end of the rim adjacent to aperture 8 has pivotally mounted on its inside surface at 9, a locking clip 10 provided with a tapered end 11 and an elongated arm portion 12 for operating same. The tapered end 11 engages the inner surface of cleat 6 at a point beneath the hook 7 and when thrown into place locks said cleat and hook into positive position, thereby securely connecting the split ends of the rim base, and assisting in providing substantially a solid rim of any desired type, such as the clencher base or straight side base rims. Apertures 13 are provided in the split ends of said rim for use in connection with the rim tool.

The operation of this rim is as follows: When an inflated tire is to be removed from the rim, a manually controlled tool of a suitable nature is utilized for collapsing the same at a point immediately adjacent to the split by inserting lugs within apertures formed in said rim and by throwing one of the split ends into an eccentric unlocked position which releases the locking cleat 6 after the locking clip 10 is moved to an open position. The remounting of a tire is made by means of mounting the shoe on the rim base when the same is in the unlocked position. The rim tool utilized is shown and described in a copending case, the same being referred to herein for the purposes of defining the invention.

It is obvious that the invention as herein shown and described may be varied in many ways without departing from the spirit of the invention.

What I claim and desire to secure by Letters Patent of the United States, is:—

A device of the character described comprising a rim base split transversely thereof on a diagonal plane at a single point, having formed on its front edge an annular rib adapted for annular support around the entire inner surface of said rim base, a cleat riveted to the under side of said base on one of the split ends, having formed thereon a locking hook bent upwardly in a greater diagonal plane than the plane of the split in said base, an aperture cut in the opposite split end of said base adapted to receive said locking hook, a locking clip pivotally mounted in the opposite split end of said base adjacent to said aperture and adapted to engage the hook end of said cleat, said clip being adapted to hold and lock the hook end of said cleat in said aperture and to assist in holding the split ends of said rim base securely in circumferential alinement.

In testimony whereof I have hereunto signed my name in the presence of two subscribing witnesses.

FREDELLIA H. MOYER.

Witnesses:
  H. T. BELKNAP,
  E. C. SIEFERD.